United States Patent [19]

Nava

[11] 4,338,070
[45] Jul. 6, 1982

[54] APPARATUS FOR MOLDING REINFORCED RESIN PRODUCTS

[76] Inventor: Pier L. Nava, Verderio Superiore (Como), Italy

[21] Appl. No.: 215,881

[22] Filed: Dec. 12, 1980

[30] Foreign Application Priority Data

Dec. 20, 1979 [IT] Italy ............... 28274 A/79

[51] Int. Cl.³ .................. B29D 3/00; B29C 1/12; B29D 9/04
[52] U.S. Cl. .................. 425/112; 425/521; 425/129 R; 425/135; 425/155; 425/163; 425/417; 425/427; 425/457
[58] Field of Search ......... 425/419, 542, 417, DIG. 5, 425/DIG. 14, DIG. 58, 135, 405 R, 405 H, 457, 468, 469, 155, 163, 389, 503, 521, 427, 112, 129 R; 264/314, 257, 318; 249/63-65, 67, 68, 142-145, 175, 178, 180, 184, 186, 127, 150, 152, 161, 170, 171

[56] References Cited

U.S. PATENT DOCUMENTS

| 1,637,707 | 8/1927 | Porter | 425/DIG. 14 |
|---|---|---|---|
| 1,747,679 | 2/1930 | Perry | 249/180 |
| 2,363,107 | 11/1944 | Young | 264/314 |
| 2,750,629 | 6/1956 | Baudoli | 425/DIG. 14 |
| 3,058,153 | 10/1962 | Busch | 425/468 |
| 3,814,374 | 6/1974 | Beemer et al. | 249/183 |
| 3,975,493 | 8/1976 | Tigner et al. | 264/314 |
| 4,128,375 | 12/1978 | Schubert | 425/DIG. 19 |
| 4,133,626 | 1/1979 | Schubert | 425/417 |
| 4,187,271 | 2/1980 | Rolston et al. | 264/314 |
| 4,239,473 | 12/1980 | Fulhaber | 249/184 |
| 4,266,750 | 5/1981 | Gallizia | 425/DIG. 14 |

FOREIGN PATENT DOCUMENTS 38-7476  5/1963  Japan ................... 264/314

Primary Examiner—Willard E. Hoag
Attorney, Agent, or Firm—Ladas & Parry

[57] ABSTRACT

The procedure is actuated by the apparatus shown in FIG. 3, part B of the mold of which, relatively movably, holds an elastically deformable chamber C which is caused to expand by a fluid under pressure. Into cavity A1 of relatively fixed mold A textile reinforcement D and some liquid resin is placed. If the product to be molded has projecting parts A1, part B is provided with pushers 12 having shaped ends 14, actuated by a pressurized fluid to push forward a part of woven armor D into cavity A4 before causing chamber C to expand. When this condition occurs, the liquid resin is pressed into the structure of reinforcement D and, in solidifying, takes on the shape of cavity A1 of the mold.

4 Claims, 4 Drawing Figures

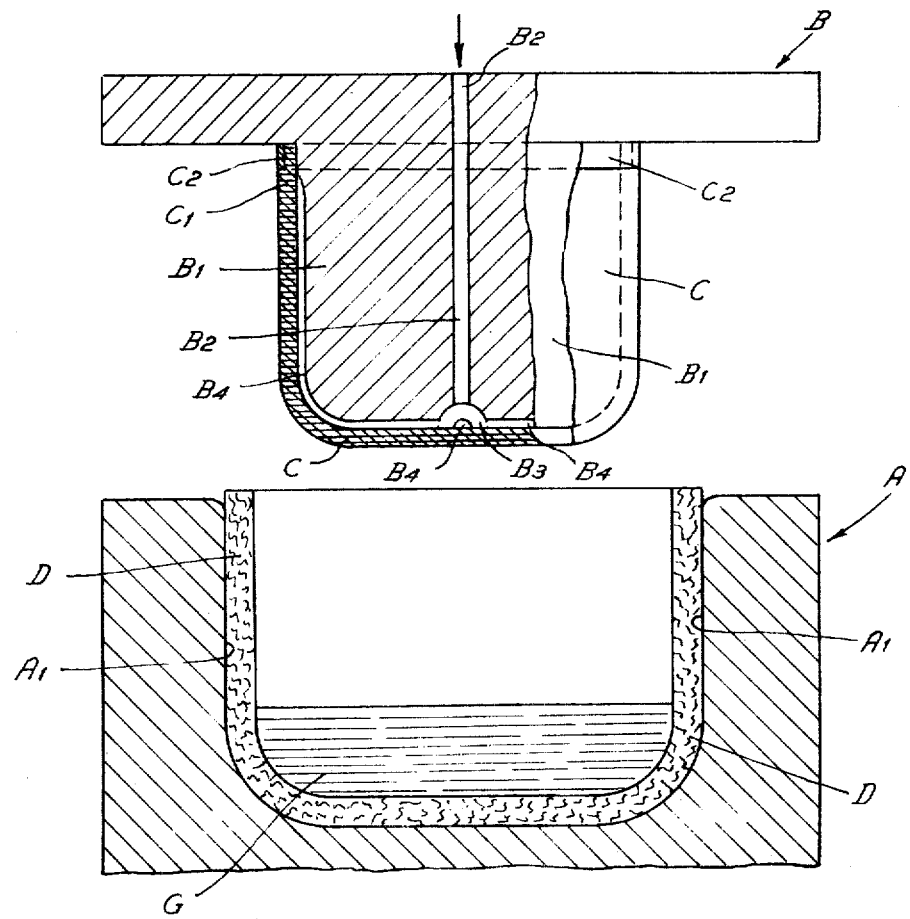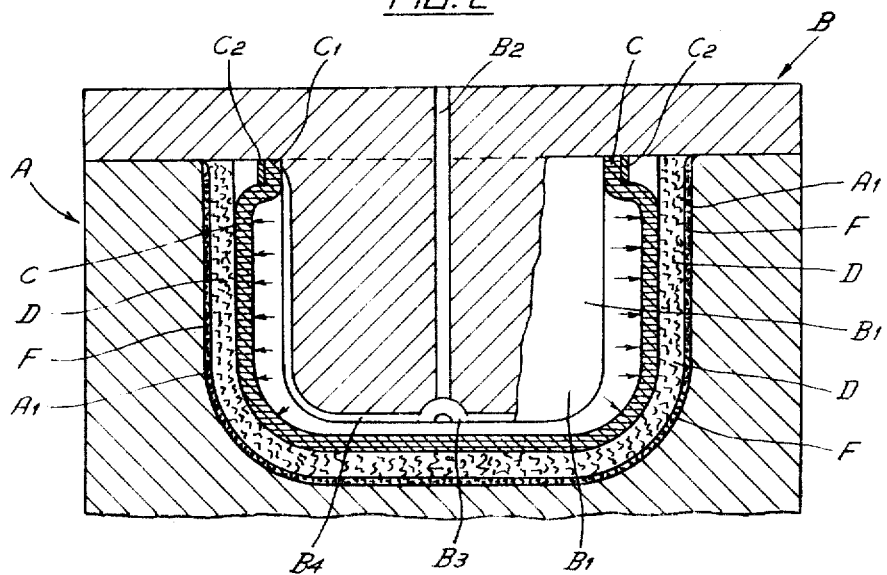

APPARATUS FOR MOLDING REINFORCED RESIN PRODUCTS

DESCRIPTION

The invention relates to a procedure and relevant apparatus to obtain, by molding, products in reinforced resin, in which the reinforcing armour consists, in general, of fabric material and which, in relation to the required application characteristics of the product, may take on a pre-determined shape.

The scope of the invention is to provide finished products in reinforced resin, the characteristics of which (especially their resistance to stresses) are uniform and constant in every section of the finished product's structure.

With particular, but not limiting reference to the making of containers or cable bodies in general having complex outlines and shapes, present day technology does not allow for their production with a structure that may be satisfactory for all stresses deriving from use and, in particular, to any over pressures which might occur in such tanks or containers.

It is not possible, moreover, to produce products of complex outlines, for example, parts in relief or forming under cuts.

The present day procedures to provide products in reinforced resins of certain dimensions are usually worked open case, that is, at atmospheric pressure, as a result of which the resin sometimes does not penetrate, as required, through the entire thickness of the reinforcement. This drawback is overcome by fabricating the products in anticlaves: in this case production is not economic and is dependent on the size of the products to be obtained, and the penetration of the resin into the textile reinforcement is not always attained, especially if the reinforcement is considerably thick and/or compact.

The present invention proposes to overcome the drawbacks and limitations already considered, as well as others, and proposes the production both of reinforced products, such as vessels and the like, for which uniform structures and thicknesseses are mandatory in order to withstand the stresses in actual operation, as well as products with complex configurations such as, for example, protective headgears, screens and fairings for vehicles and industrial applications in general. In brief, the present invention proposes to provide products reinforced resin with uniform and homogeneous structures in all its sections, avoiding any localized flaking or cracking.

The procedure according to the present invention obviates the above and other drawbacks and proposes to provide in a practical and rational manner—and hence economically—reinforced resin structures apt to withstand stresses in use from all apsects.

A further object of the invention is to provide reinforced resin structures with complex outlines and which call for the adoption of molds consisting of several parts which may be joined to each other according to requirements and which permit products to be obtained, joining surfaces of which (especially visible surfaces) are continuous and smooth, that is free from the ribs and imperfections normally presented by the usual products and caused by the joints of the various mating components of a mold.

Essentially, the procedure according to this invention is characterized in that the liquid resin present in the mold is subjected to the action of a fluid under pressure by means of an elastically deformable surface which develops its action, in addition to the resin itself also on at least a parts of the reinforcing fabric of the product.

Depending on the final characteristics of the product and the properties of the materials used, the invention contemplates the adoption of a fluid under pressure at suitable temperature to transmit and apply the latter to the product in the phase of its molding.

The apparatus or mold actuating the procedure described above, in which two reciprocally movable parts are provided with complementary shaped surfaces reproducing in the negative and in the positive the outline of the product, is characterized in that at least one of the two parts embodies an element elastically deformable by a pressurized fluid and which is interposed between the reinforcing armour for the product and the shaped surface of said part of the mold.

If the product has projecting parts or under cuts, the latter can be achieved by means of molds in which the shaped element of the relatively movable part of the mold is provided (opposite to the projecting part) with a pusher having a shaped end complementary to the outline of said part in relief, and control means to engage such pusher and the armour in the mold to press said reinforcement against the outline of the other part of the mold.

The invention will now be explained in the following description, referring to the annexed drawings, which illustrate, by way of example, some forms of embodiment of the apparatus for actuating the procedure according to the invention.

In the drawings:

FIGS. 1 and 2 illustrate schematically, in cross section, one form of embodiment of the apparatus or mold during certain stages of the procedure according to the invention.

Figure 3:
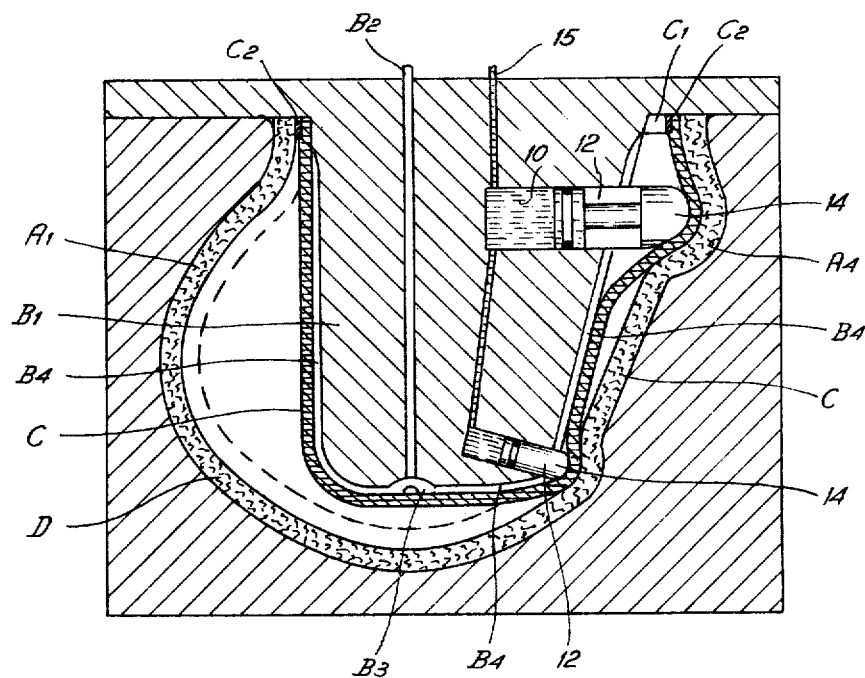
FIGS. 3 and 4 are cross sections of two different forms of embodiment of the mold.

Some examples of embodiment of the procedure according to the invention will be described in conjunction with the structural features of the molds shown in the drawings.

In FIGS. 1 and 2 of the drawings, the mold illustrated consists of a relatively fixed or female part A provided with a cavity A1 reproducing the negative, the form of the reinforced resin product to be obtained, and of a relatively movable or male part B. Said parts are secured, in the known manner, to the planes of a press so as to close upon each other.

Shaped part B1 of male element B houses an elastically deformable element or chamber C, the outer surface or contour of which substantially corresponds to the internal contour of cavity A1. Chamber C is made of suitable elastic material, such as rubber or an elastomer apt to withstand, besides the usual pressure, also high temperatures, as will be described hereafter. Edge C1 of chamber C is sealed by a collar C2 to the top periphery of shaped part B1.

One or more conduits B2 are provided in male part B to connect a source of pressurized fluid (not shown) with one or more collecting chambers B3 provided at the lower extremity of shaped part B1 and which are closed by the inside wall of elastic chamber C. From each of chambers B3 depart grooves B4 terminating in proximity to collar C2.

At the start of the procedure according to the invention reinforcing armour D is secured to either one of the two parts of the mold: in the case illustrated, the armature (conveniently pre-formed) is introduced into cavity A1 and conveniently fixed to give it a suitable tension. Reinforcing armour D consists, as known, of natural and/or artificial and/or synthetic textile fibers, such as asbestos, glass, cotton, acrylic resins, polyamides, etc., arranged as pre-formed or felted materials or in the form of a fabric, depending on requirements in each case. Advantageously, reinforcement D is formed by a number of layers superimposed up to the desired thickness. Again in relation to the characteristics of the product to be obtained, a reinforcement, also woven or net-like fabric, may be adopted. In this case, the reinforcing armour consists of several superimposed layers of fabric to which a tension is previously applied.

The mold shown in FIG. 2 is identical to that of FIG. 1 and its parts are identified by the same reference symbols of FIG. 1. Said mold represents a variation of the embodiment of the procedure having the scope of obtaining products with smooth surfaces, and without ribs, which are noted in the usual products and which are due to the mating of one of the two parts of the mold, in particular, fixed part A, when said part consists of a plurality of elements A3 which are separable from and re-joinable to each other to allow removal of the product.

According to this invention, said drawback is eliminated by introducing into cavity A1 of fixed part A of the mold (consisting, as already stated, of a plurality of elements which may be joined to and assembled with one another) a lining element F in elastically flexible material, for example rubber. Element F is shaped in conformity with the product considered: hence, it adheres to the walls of cavity A1 without causing, during the molding phase, and under the effects of pressure, the formation of ribs or imperfections on the surface of the product, due to the presence of mating connecting surfaces between the assembled elements A3 constituting lower part A of the mold.

The lining elements or jacket F may be made of suitable material in a suitable manner so as to ensure constant thickness and flexible adherence to the walls of cavity A1. For example, jacket F may be obtained by immerising the form reproducing the external outline of the final product in a suitable latex or resin solution to fomr a lining of the thickness desired, which, once removed from the mold constitutes said jacket F. The latter, before use, may be subjected to suitable treatment to render its inner surface repellent to the resin used in molding the product in order to make said jacket re-usable, if necessary, for molding additional products. Otherwise, flexible jacket F may be incorporated superficially into the resin used to product the object, thus forming an elastic lining film adherent to said object.

With reference to the above considered characteristics and relative to the molds of FIGS. 1 and 2, the actuation of the procedure according to the invention is evident. Textile reinforcement D (FIG. 1) alone or jacket F and textile reinforcement D (FIG. 2) are placed in cavity A1. A liquid resin is introduced into said cavity in any known manner, also by injection and, in the latter case, with the mold closed. If required, textile reinforcement D can be fixed to one part of the mold in such way to maintain it in tension, i.e. it may be made by suitably deforming chamber C and maintaining said deformation until after the injection and consolidation of the resin in cavity C. After closing the mold, a pressureized fluid is introduced, through conduit B2, into chamber C, which pressurized fluid causes chamber C to deform (see FIG. 2) and presses the liquid resin into the structure of reinforcement D and the whole against the wall of cavity A1.

When the resin injected into the mold consolidates, the pressure is discharged from chamber C and the finished product is removed from the mold. Obviously, the above considered procedure may also be taken into account in the following description with reference to FIGS. 3 and 4.

Figure 4:
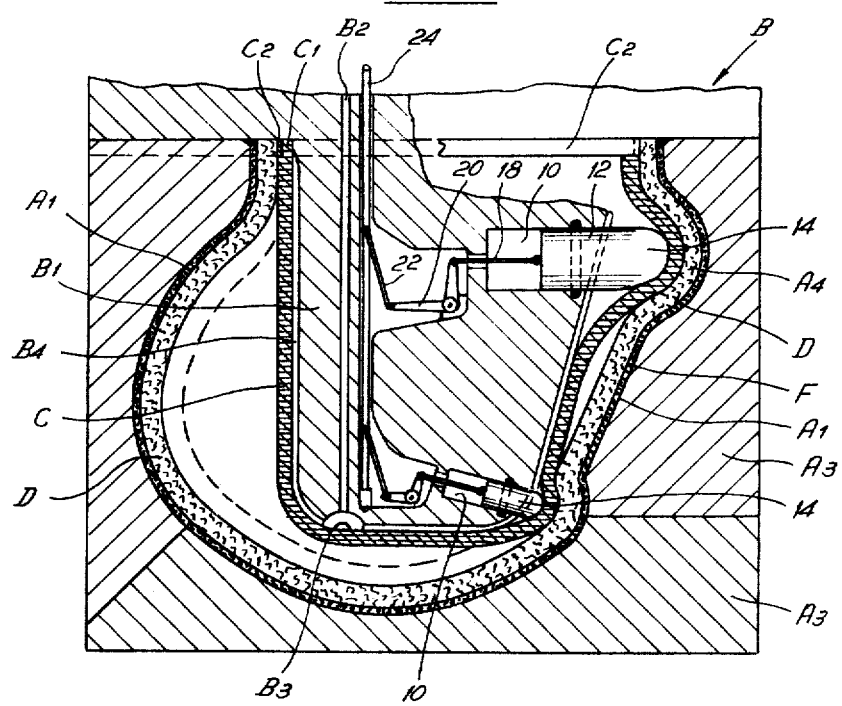

With reference to FIGS. 3 and 4 of the drawings, the structure of the mold shown will be described in relation to the procedure according to the invention, the mold being intended to produce objects of complex shapes, i.e. when said products have parts in relief or under cuts. In this case, the lower part A of the mold consists of a number of assembling elements A3 (FIG. 3) while its upper or movable part B has, in suitable positions, chambers 10, in each of which runs a pusher 12 terminating with a shaped head 14 having an outline similar to that of recesses part A4 of cavity A1 of the mold.

Each one of pushers 12, in the case of FIG. 3, runs guided in air-tight relationship in relevant chamber 10 into which may be fed a suitable fluid through pipe 16 to feed chambers 10 with said pressurized fluid, for example, air or oil under pressure. In this case, it is not excluded that said chambers 10 are fed by the pressurized fluid which feeds chamber C and said feeding may be controlled by means of a suitable distributor to obtain the desired molding cycle, as described hereafter.

In the case of the embodiment shown in FIG. 4, pushers 12 are connected by means of coupling linkages (18-20-22) with a control rod 24 connected in turn to a driving motor consisting, for example, of a cylinder/piston assembly, to press shaped heads 14 against elastic chamber C to textile reinforcementD and the whole against recessed parts A4. Again with reference to the mold shown in FIG. 4, the elastic jacket F may be inserted into cavity A1 to avoid the formation of ribs on the surface of the product where the mating points of assembling elements A3 constituting fixed part A of the mold meet.

With reference to the characteristic structures of the molds described, shown in FIGS. 3 and 4 of the drawing, the implementation of the procedure according to the invention is initially effected in the manner already described for the molds illustrated in FIGS. 1 and 2.

Specifically, textile reinforcement D is placed into top part B1 or within cavity A1 of the lower part: this operation may be preceded, if necessary, by fitting elastic lining F in cavity A1.

Successively, the liquid resin G is introduced into the cavity formed by textile reinforcement D and the mold is closed. This operation is conducted so as to created, in the liquid resin mass G, a pressure gradient which may be progressively increased up to a suitable maximum value, in order to put at least part of textile reinforcement D in tension and to cause the liquid resin to penetrate gradually and completely reinforcement D.

When the mold is closed, cavity A1 is made practically air-tight and a pressurized fluid is introduced through conduit B2, which fluid, in the case of FIG. 3, at first actuates pushers 12 and, successively, causes expansion of elastic chamber C.

With reference to the mold of FIG. 4, the operations above considered taken place in a similar manner, i.e. at first pushers 12 are actuated by means of rod 24 and then pressure is applied to chamber C.

It follows that in both cases the liquid resin G is pressed and made to penetrate completely and evenly the entire thickness of reinforcement D and forms an external shaped layer corresponding to the surfaces of shaped cavity A1 (FIG. 4) or of jacket F in cases in which said jacket is in said cavity.

A synthetic reinforced resin product of the desired form is thus obtained, in which resistant reinforcement D is incorporated and embedded homogeneously with said resin, and to at least part of which is applied a suitable tension which is maintained also when bonding resin is consolidated. In this way a constant structure to the product in all its different sections in ensured, and where said reinforcement develops its strengthening function in all the different sections of the product itself.

In order to provide reinforced resin structures having the desire characteristics, especially with regard to the type of resin used, in each case, the invention also contemplates the molding effected with the aid of heat. For this purpose, the heat source may be located, as in most known forms of molds, in the lower part A of the mold itself. Otherwise, in a particularly advantageous manner and according to this invention, the heat source is provided, in addition to the bottom part A of the mold, also by upper part B of the mold. In this case, the heat is provided by introducing into chamber C a pressurized fluid at suitable temperature, for example, steam or oil may be introduced into said chamber at a pressure suitable to deform chamber C and exert, on liquid resin G, the reqired thermal action which may be increased and assured by heating constantly, in addition to chamber C, also shaped part B1. Obviously, and if the molding conditions of the product require it, a refrigerating (cooling) fluid may be introduced into elastic chamber C after the molding.

Again in relation to the implementation of the procedure according to the invention, reinforcement D, of any type, may be secured, initially, to shaped part B1 of the upper part of the mold. Said reinforcement may be pretreated with resins to ensure and maintain the structure of the different fabric layers of the armour, in particular their pre-tension, before they are incorporated into the structure of the molded product. Moreover, the penetration of the liquid resin through the reinforcement during molding of the product is facilitated.

The pre-forming operation obtainable with the molds of FIGS. 3 and 4 can be effected before introducing liquid resin G into cavity A1 of the mold, since, as already stated, said pre-forming is ensured also when, for any reason, upper part B of the mold is moved away from lower part A since resistant reinforcement D substantially maintains the shape imparted to it, especially if it has been previously imbibed with or provided with a resin lining. After the pre-forming above mentioned, the liquid resin G is introduced into the mold and pushers 12 can be maintained in their position also because the elastic defomation of chamber C occurs and is completed.

From the above, the achievements and scopes of the invention are evident, that is, satisfactory products under all aspects are obtained, in the sense that said products are apt to withstand effectively mechanical stresses of considerable intensity, with respect to their dimensions. In particular, it is possible to obtain containers apt to withstand high pressure—the walls of said containers deform elastically in such way that once the action of the pressure has ceased, they resume their initial characteristics.

Modifications and variations may be introduced, in particular to the apparatus or molds used to actuate the procedure according to this invention, depending on the specific requirements of the resin reinforcement structure produced in each case.

The present invention, therefore, extends also to the apparatus or mold and also to the reinforced resin products obtained with said procedure, without departing from the domain and scope of the invention itself.

I claim:

1. Apparatus for molding reinforced resin products, comprising: a female mold part having a shaped inner surface complementary to the outline of a product to be molded, which outline includes at least one localized projection reproduced in the negative by said shaped surface of said female mold part, said female mold part having adjacent to and coextensive with its shaped inner surface a textile reinforcement for the product to be molded; and a male mold part movable in and out of said female mold part with substantial clearance and having a shaped outer surface dissimilar to said product outline, said male mold part being encompassed by an attached elastic element which, in use, is outwardly deformable by a pressurized fluid introduced between it and said male mold part in order to force liquid resin occupying said substantial clearance into said textile reinforcement and produce tension in said textile reinforcement by pressing against it, said male mold part including a slidable pusher operable to outwardly deform a portion of said elastic element adjacent the shaped inner surface region of said female mold part where said localized projection of the product to be molded is reproduced in the negative, said pusher having a working end generally corresponding in shape to said projection and being effective to augment the tension produced in said textile reinforcement by the pressurized fluid-induced deformation of said elastic element at said shaped inner surface region, said pusher being slidably mounted in guides provided in said male mold part and being operatively linked to a movable control rod extending out of said male mold part.

2. Apparatus for molding reinforced resin products, comprising: a female mold part having a shaped inner surface complementary to the outline of a product to be molded, which outline includes at least one localized projection reproduced in the negative by said shaped surface of said female mold part, said female mold part having adjacent to and coextensive with its shaped inner surface a textile reinforcement for the product to be molded; and a male mold part movable in and out of said female mold part with substantial clearance and having a shaped outer surface dissimilar to said product outline, said male mold part being encompassed by an attached elastic element which, in use, is outwardly deformable by a pressurized fluid introduced between it and said male mold part in order to force liquid resin occupying said substantial clearance into said textile reinforcement and produce tension in said textile reinforcement by pressing against it, said male mold part including a slidable pusher operable to outwardly deform a portion of said elastic element adjacent the shaped inner surface region of said female mold part where said localized projection of the product to be molded is reproduced in the negative, said pusher having a working end generally corresponding in shape to said projection and being effective to augment the tension produced in said textile reinforcement by the pressurized fluid-induced deformation of said elastic element at said shaped inner surface region, said pusher being slidably mounted in air tight relation in a pressure chamber provided in said male mold part, said male mold part including a conduit for connecting said pressure chamber to a source of pressurized fluid which is the same pressure source as that which introduces pressurized fluid between said elastic element and said male mold part, there being means provided for delaying the establishment of fluid pressure between said elastic element and said male mold part until just after said pusher is operated.

3. Apparatus according to claim 2, wherein said elastic element defines with said shaped outer surface of said male mold part a deformable chamber being connectable with said source of pressurized fluid.

4. Apparatus according to claim 3, wherein said shaped outer surface of said male mold part has formed therein a collecting chamber and a plurality of grooves connecting said collecting chamber to said deformable chamber, and wherein a second conduit is provided in said male mold part for connecting said source of pressurized fluid to said collecting chamber for distribution of said fluid via said grooves to said deformable chamber.

* * * * *